May 10, 1938. H. J. GOLDBLATT ET AL 2,116,756
CULINARY APPLIANCE
Original Filed March 30, 1936
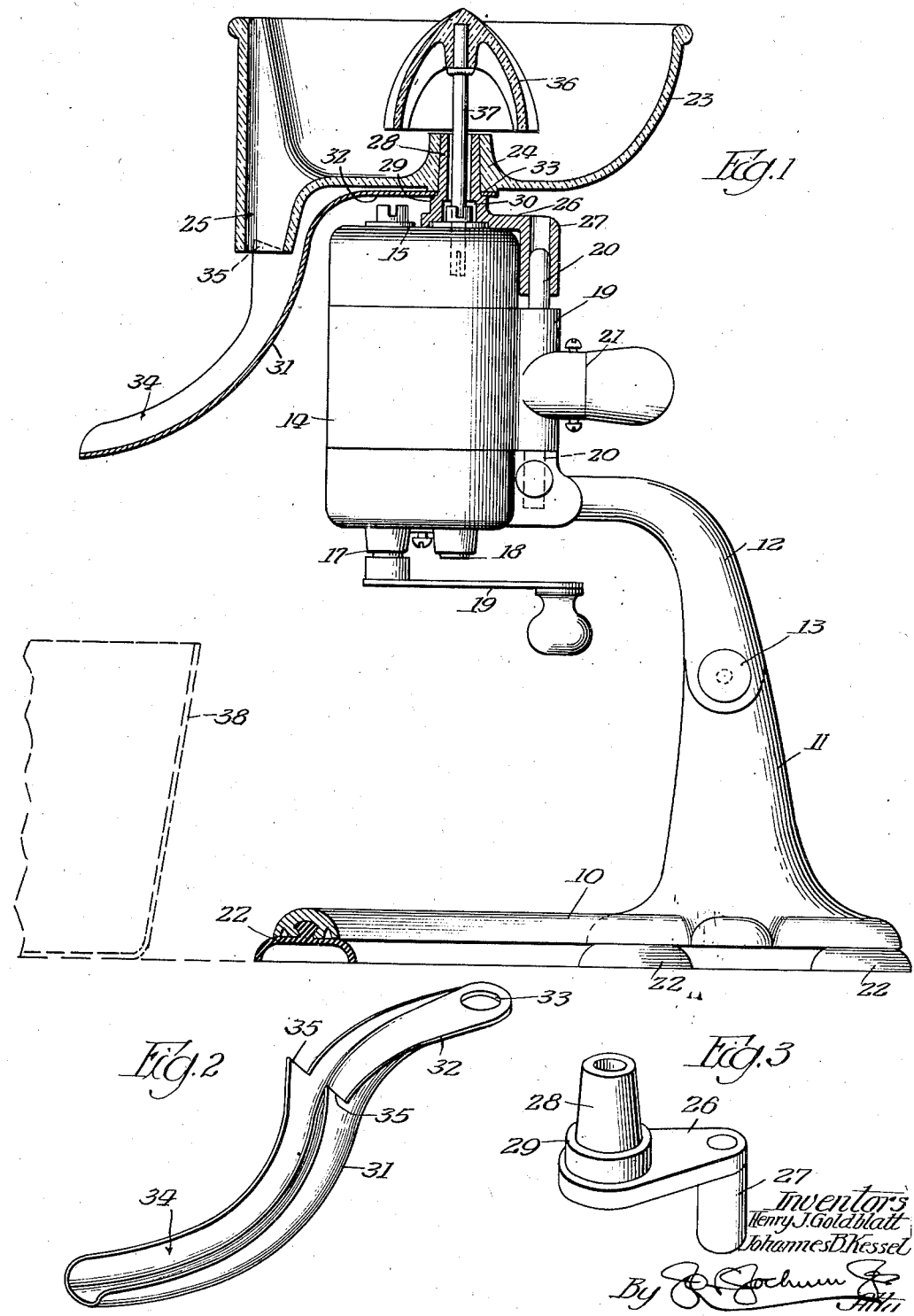
Inventors
Henry J. Goldblatt
Johannes D. Kessel Patented May 10, 1938

2,116,756

UNITED STATES PATENT OFFICE 2,116,756

CULINARY APPLIANCE

Henry J. Goldblatt and Johannes B. Kessel, Chicago, Ill., assignors to Vidrio Products Corporation, Chicago, Ill., a corporation of Illinois Original application March 30, 1936, Serial No. 71,648. Divided and this application February 8, 1937, Serial No. 124,673

5 Claims. (Cl. 146—3)

This application is a division of original application Serial Number 71,648 filed March 30, 1936, and relates more specifically to a nozzle or spout for use in connection with a juice extracting attachment for machines of the type disclosed in the aforesaid application.

One of the objects of the invention is to provide an improved form of nozzle or spout for directing the juice from an extracted juice container into a mixing bowl or other container.

A further object is to provide improved means whereby the spout or nozzle may be readily applied and secured in position for use, and as readily detached or removed when desired.

To the attainment of these ends and the accomplishment of other new and useful objects as will appear, the invention consists in the features of novelty in substantially the construction, combination and arrangement of the several parts hereinafter more fully described and claimed and shown in the accompanying drawing illustrating this invention, and in which Figure 1 is a view partly in side elevation, partly in section, and with parts broken away, of a device of this character constructed in accordance with the principles of this invention.

Figure 2 is a detail perspective view of the spout or nozzle.

Figure 3 is a detail perspective view of an adaptor or mounting by means of which the juice extractor bowl and the nozzle may be removably held in position.

Referring more particularly to the drawing, the numeral 10 designates a supporting base provided with an upright or standard 11 rising thereabove, and 12 designates an arm or bracket, one end of which is pivotally connected as at 13 to the standard 11 and the arm or bracket is adapted to swing about the pivot so as to position a casing 14 for use.

Within the casing 14 is arranged driving mechanism and projecting from the casing and beyond the ends thereof are the extremities 15, 16, 17 and 18 of rotatable shafts to any of which shafts a handle 19 is adapted to be connected, according to the use to which the apparatus is to be applied and also according to the position of the casing 14.

A portion of the casing 14 is preferably shaped to form an extension 19 and arranged parallel to the longitudinal diameter of the casing is a bar or rod 20, the extremities of which project beyond opposite ends of the casing. These projecting extremities are spaced from the casing a sufficient distance to allow one or the other of the extending portions to be inserted into a socket at the free end of the arm 12 so that either end of the casing 14 may be placed uppermost.

A handle 21 may also be provided for manipulating or positioning the casing 14.

The arm or bracket 12 and the standard 11 are of such a length as to hold the lower end of the casing 14 at any desired or suitable distance above the base or standard 10 and if desired suction cups 22 may be provided on the lower face of the base 10 to maintain the apparatus against movement over the supporting surface upon which the base rests. A bowl or receptacle 23 is preferably provided with a thickened portion 24 to form a hub which is hollow, and arranged at one side of the bowl is an annular discharge outlet or nozzle 25 arranged perpendicularly, the lower end of the nozzle being open.

The numeral 26 designates a mounting bracket which is provided with a depending tubular portion 27 and an upwardly projecting tubular portion 28, the latter being of any desired configuration but is preferably of conical shape and provided with a peripheral shoulder 29, the opening in the upright 28 passing entirely through the adaptor 26. The lower end of the opening is preferably enlarged as at 30, and which portion 30 is adapted to receive one of the projecting ends, 15, 15, 16 or 18, of the driving mechanism within the casing 14, while the depending tubular portion 27 telescopes over the adjacent end of the projection 20.

The hollow hub 24 of the bowl 23 is adapted to telescope over the tubular upright 28 of the mounting bracket 26, so that the bottom of the receptacle 23 will rest upon the shoulder 29.

The numeral 31 designates a spout of any desired shape but is preferably of a channel form, and is adapted to be positioned to receive the juice or material discharged from the bowl 23 through the discharge outlet or nozzle 25.

This spout is preferably constructed to provide a substantially flat portion 32 adjacent one end, having an opening 33 in proximity to the extremity thereof, and through which opening 33 the tubular upright or projection 28 on the mounting bracket 26 passes. The extremity of the spout 31 rests upon the shoulder 29 and the bottom of the bowl 23 rests against the substantially flat portion 32 of the spout.

The construction of the spout 31 is such as to provide a trough shaped portion 34, and shoulders or lips 35 are arranged between the portions 32 and 34 and rest against the outer face of the discharge outlet or nozzle 25 to hold the spout in proper position with respect to the discharge outlet or nozzle.

The extracting member 36 of any desired construction and configuration, but preferably conical, is arranged within the bowl 23 and is connected to a shaft 37, the latter projecting through the tubular upright portion of the adaptor 28 of the bracket 26 and telescoping into the adjacent projecting extremity of one of the elements of the drive mechanism which is arranged within the casing 14.

The shoulder 29 on the bracket 26 is of such a width that when the bowl 23 rests against the extremity of the spout, these parts will be held in position and the lips or projections 35 will hold the spout against relative rotation with respect to the bowl 23.

It will therefore be seen that with this construction the bowl 23 may be rotated upon the upright projection 28 of the bracket 26 so as to move the delivery end of the spout 33 into any desired position and so that it will discharge into a bowl or receptacle 38.

It will be obvious that with this construction and arrangement the casing 14 containing the driving mechanism may be positioned with either of its ends uppermost and the crank or handle 19 is adapted to be connected to either of the projecting extremities of the driving mechanism, so that no matter which end of the casing 14 is arranged uppermost the juice extractor bowl and nozzle 31 may be readily connected or positioned through the medium of the adaptor or bracket 26.

While the preferred form of the invention has been herein shown and described, it is to be understood that various changes may be made in the details of construction and in the combination and arrangement of the several parts, within the scope of the claims, without departing from the spirit of this invention.

What is claimed as new is:—

1. A culinary appliance embodying a casing, means for supporting the casing, said casing having driving mechanism, an extractor bowl mounted on top of said casing, a juice extractor element within the bowl driven by said mechanism, a vertical discharge annular neck leading from the bottom of the bowl, a spout with which said neck communicates, and means for anchoring a portion of said spout between the said casing and the bowl, portions of the spout intermediate its ends only partially encompassing said neck.

2. A culinary appliance embodying a casing having driving mechanism, means for supporting the casing, an extractor bowl mounted on top of said casing, a bracket removably secured to said casing, a portion of the bracket being disposed between said casing and bowl, a vertical discharge annular neck leading from the bottom of said bowl, and a spout with which said neck communicates, a portion of the spout being disposed between adjacent faces of the casing and bowl, said bracket passing through a portion of the spout.

3. A culinary appliance embodying a casing having driving mechanism, means for supporting the casing, an extractor bowl mounted on top of said casing, a bracket removably secured to said casing, a portion of the bracket being disposed between adjacent faces of said casing and bowl, a vertical discharge annular neck leading from the bottom of said bowl, a spout with which said neck communicates, a portion of the spout being disposed between adjacent faces of the casing and bowl, said bracket passing through a portion of the spout, and projections on the spout engaging opposite sides of said neck.

4. A culinary appliance embodying a casing having driving mechanism, means for supporting the casing, an extractor bowl mounted on top of said casing, a removable bracket disposed between said casing and bowl, a vertical discharge annular neck leading from the bottom of said bowl, a spout with which said neck communicates, a portion of the spout being disposed between the casing and bowl, said bracket passing through a portion of the spout, said bracket provided with oppositely projecting portions, one of said portions telescoping into the bottom of said bowl, and means with which the other of said portions of the bracket co-operates, for assisting in maintaining the bracket in position.

5. As an article of manufacture, a spout for attachment to a juice extractor bowl, one end of said spout being of a substantially trough shape configuration, the other end being substantially flat and provided with an aperture adjacent the extremity of the last said end, and laterally spaced ears projecting beyond the tops of the side walls of the spout and disposed between and spaced a substantial distance from the ends of said spout.

HENRY J. GOLDBLATT.
JOHANNES B. KESSEL.